United States Patent
Gänsicke et al.

(10) Patent No.: US 6,516,636 B1
(45) Date of Patent: Feb. 11, 2003

(54) METHOD FOR PRODUCING A TUBE MADE OF QUARTZ GLASS USING LOW INTERNAL PRESSURE AND CONTROL OF DIAMETERS

(75) Inventors: Frank Gänsicke, Wächtersbach (DE); Oliver Ganz, Bruchköbel (DE); Harald Hain, Kahl (DE); Thomas Bogdahn, Karlstein (DE); Oliver Humbach, Seligenstadt (DE)

(73) Assignee: Heraeus Quarzglas GmbH & Co. KG, Hanau (DE)

(*) Notice: Subject to any disclaimer, the term of this patent is extended or adjusted under 35 U.S.C. 154(b) by 0 days.

(21) Appl. No.: 09/601,460
(22) PCT Filed: Dec. 6, 1999
(86) PCT No.: PCT/EP99/09513
§ 371 (c)(1), (2), (4) Date: Aug. 2, 2000
(87) PCT Pub. No.: WO00/34193
PCT Pub. Date: Jun. 15, 2000

(30) Foreign Application Priority Data

Dec. 10, 1998 (DE) .......... 198 56 892

(51) Int. Cl.⁷ .......... C03B 37/012
(52) U.S. Cl. .......... 65/379; 65/382; 65/393; 65/404; 65/489; 65/491; 65/435; 65/381
(58) Field of Search .......... 65/382, 379, 393, 65/404, 489, 491, 435, 381

(56) References Cited

U.S. PATENT DOCUMENTS

| | | | | |
|---|---|---|---|---|
| 4,551,162 A | * | 11/1985 | Hicks, Jr. .......... | 385/126 |
| 4,764,194 A | * | 8/1988 | Maklad .......... | 65/393 |
| 4,936,891 A | * | 6/1990 | Gunther et al. .......... | 156/244.18 |
| 5,167,684 A | * | 12/1992 | Turpin et al. .......... | 65/110 |
| 5,785,729 A | * | 7/1998 | Yokokawa et al. .......... | 65/102 |
| 6,098,428 A | * | 8/2000 | Bogdahn et al. .......... | 65/381 |

FOREIGN PATENT DOCUMENTS

| | | |
|---|---|---|
| DE | 39 13 875 | 8/1990 |
| DE | 195 36 960 | 3/1996 |
| FR | 2 436 111 | 4/1980 |
| JP | 5-294651 | * 11/1993 |

* cited by examiner

*Primary Examiner*—John Hoffmann
(74) *Attorney, Agent, or Firm*—Andrew L. Tiajoloff

(57) ABSTRACT

In a known method for the manufacture of a tube made of a vitreous material, especially of quartz glass, a hollow cylindrical semifinished product made of a vitreous material is carried essentially vertically to a heating zone, wherein it is heated and drawn off downwards—without the use of tools—to the tube by forming a transitional area from semifinished product to tube, while diameter and wall thickness of the tube are continuously measured, and the tube's measured geometrical data being used to generate a control signal with the aid of which a pressure difference is regulated between pressure $P_1$ in the interior space of the semifinished product, the transitional area and the tube, as well as pressure $P_2$ in the heating chamber which is regulated in the heating zone at least in the transitional area from semifinished product to tube and its adjacent tube area. This method is to be developed further so as to enable the processing of a broader spectrum of hollow cylindrical semifinished products to tubes with the desired inside and outside dimensions. This task is solved according to the invention such that for the manufacture of tubes with the ratio of their outside diameter ($D_{Ra}$) to their inside diameter ($D_{Ri}$) being greater than the ratio of the outside diameter ($D_{Ha}$) to the inside diameter ($D_{Hi}$) of the semifinished product—pressure $P_1$ in the inside space of the semifinished product, the transitional area and the tube being kept at a value which is smaller than the value of pressure $P_2$ in the heating chamber, with pressure $P_1$ being maintained by means of a suction (vacuum) pump.

21 Claims, 1 Drawing Sheet

Figure 1:
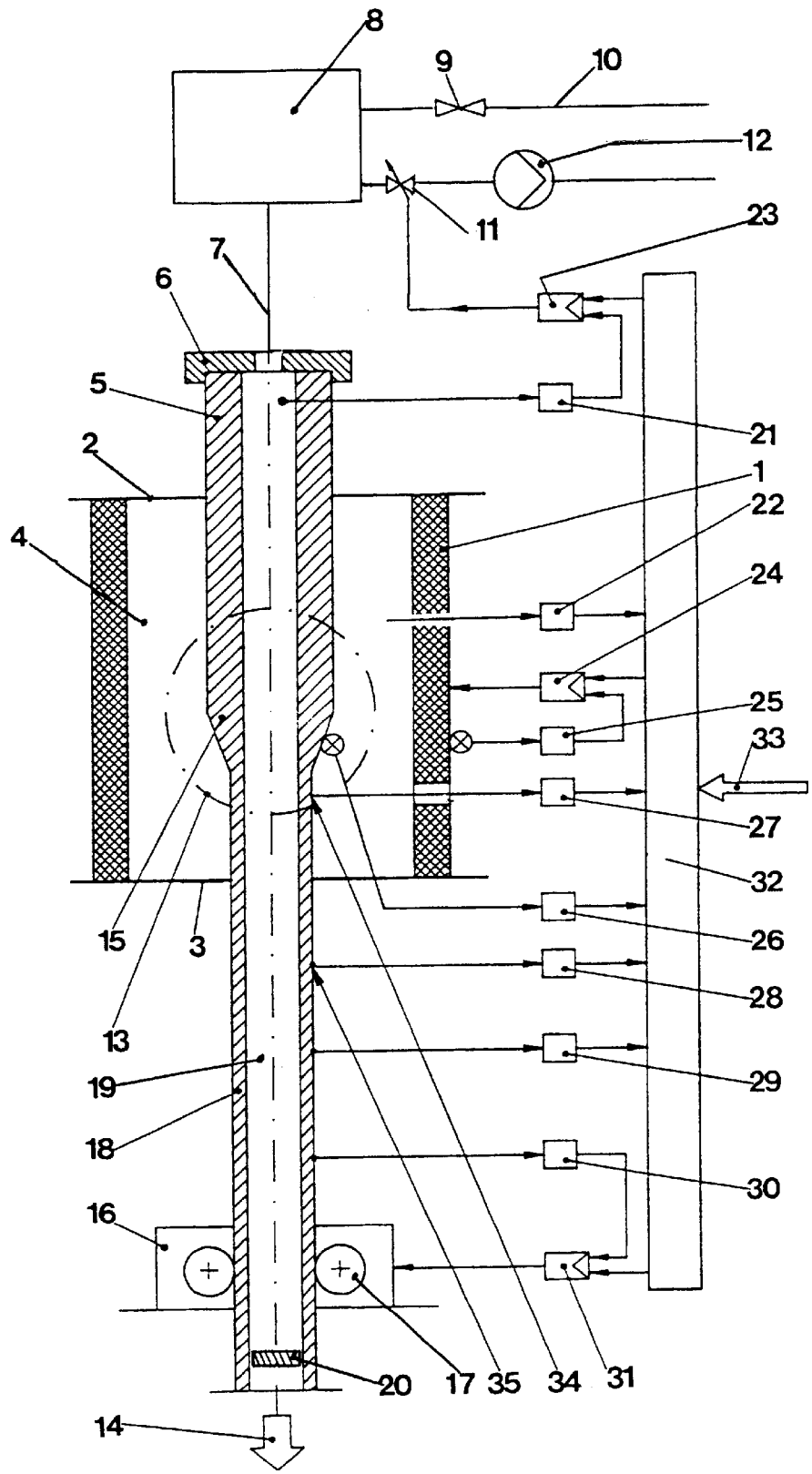

METHOD FOR PRODUCING A TUBE MADE OF QUARTZ GLASS USING LOW INTERNAL PRESSURE AND CONTROL OF DIAMETERS

This invention concerns a method for the manufacture of a tube made of a vitreous material, especially of quartz glass, in which a hollow cylindrical semifinished product made of a vitreous material is carried essentially vertically to a heating zone, wherein it is heated and drawn off downwards—without the use of tools—to the tube by forming a transitional area from semifinished product to tube, while diameter and wall thickness of the tube are continuously measured, and the tube's measured geometrical data being used to generate a control signal with the aid of which a pressure difference is regulated between pressure $P_1$ in the interior space of the semifinished product, the transitional area and the tube, as well as pressure $P_2$ in the heating chamber which is regulated in the heating zone at least in the transitional area from semifinished product to tube and its adjacent tube area.

A method, as specified above, is known from EP-A1 394 640. For the manufacture of tubes, quartz glass or highly siliceous glasses in the form of a hollow cylinder as semifinished products are drawn off to a tube in a vertical method, where the pressure in the tube's inside space is higher than the outside pressure, i.e. that pressure which is acting upon the outside of the semifinished product and of the tube in the heating zone. With this method, only such tubes can be manufactured in which the ratio of the tube's outside diameter to its inside diameter is at most equivalent to the ratio of outside diameter to inside diameter of the highly cylindrical semifinished product; however, tubes are generally obtained with the known method in which the ratio of the tube's outside diameter to inside diameter is smaller than the ratio of outside diameter to inside diameter of the semifinished product.

Furthermore, the manufacture of capillary tubes is known from EP-A1 259 877, i.e. of such tubes having a very small inside diameter. Moreover, the outside diameter of these capillary tubes is typically up to 5 times greater than the inside diameter. The manufacture of such capillary tubes is done by arranging several glass tubes of different diameters into one another, with the individual inside and outside diameters of these glass tubes being adjusted to each other. After these glass tubes are fit into one another, the arrangement is heated and the individual tubes are molten with each other by drawing into longitudinal direction. However, this procedure means that elaborate stockkeeping of glass tubes of varying inside and outside diameters is required. Moreover, the coaxial arrangement requires a support of the tubes on both ends during the drawing and melting with high precision. Furthermore, the individual, prefabricated glass tubes which are then fit into one another must be manufactured very precisely in their geometrical dimensions to ensure especially a uniform combination of the individual tubes.

Starting from the above specified state of the art, this invention is based on the task of developing the initially specified method further so as to enable the processing of a broad spectrum of hollow cylindrical semifinished products to tubes with the desired inside and outside dimensions.

The above task is solved, starting from the initially specified method, such that—for the manufacture of tubes with the ratio of their outside diameter ($D_{Ra}$) to their inside diameter ($D_{Ri}$) being greater than the ratio of the outside diameter ($D_{Ha}$) to the inside diameter ($D_{Hi}$) of the semifinished product—pressure $P_1$ in the inside space of the semifinished product, the transitional area and the tube is being kept at a value which is smaller than the value of pressure $P_2$ in the heating chamber, with pressure $P_1$ being maintained by means of a suction pump.

Due to the defined settings of pressure $P_1$ on the inside of the semifinished product or tube, respectively, and that of pressure $P_2$ on their outside and regulation by means of a nominal/actual adjustment, it is possible to adjust—over a broad range—the ratio of the outside diameter to the inside diameter of the tube to be manufactured. In particular, the method according to the invention also allows the manufacture of tubes in which the ratio of wall thickness to outside diameter is greater than in the semifinished product. The possible application of available semifinished products for tube manufacturing is considerably expanded thereby, and the flexibility and efficiency of existing tube drawing facilities is thus increased.

For an adjustment of pressure $P_1$, it is preferable—during manufacture—to keep that end of the tube closed which is facing away from the semifinished product. Pressure $P_1$ on the tube's inside will then be adjusted and kept at a precalculated value by means of a suction pump and by supplying a flow of gas which is passed into the inside of the semifinished product, the transitional area and the tube. Thus, a defined negative pressure can be maintained in the tube and defined in adjustment.

It has been shown that a tube quality can be greatly influenced by the pressure variations on the inside of the tube, even if they are only minor. To counter such pressure variations, another embodiment of the method has the flow of gas lead—prior to its introduction into the semifinished product—first to a vessel serving as buffer, being inserted between suction pump and the tube's inside space.

Furthermore, it proved advantageous to introduce an inert gas into the inside space of the semifinished product and the tube. Inert gas offers the advantage that oxidations are avoided in case of contact with hot parts, possibly even with hot furnace parts.

Especially when pressure $P_1$ in the inside space of the tube and the semifinished product is kept at a value which is 5 mbar to 200 mbar smaller than the value of pressure $P_2$ in the heating chamber, semifinished products can then be produced in which the ratio of semifinished product outside diameter ($D_{Ha}$) to semifinished product inside diameter ($D_{Hi}$) is within a range of between 1.5 and 4.5, thus in a very wide range.

The method is designed very simply when pressure $P_2$ in the heating chamber has approximately atmospheric pressure.

During the manufacture of the tube from the semifinished product, it is possible to exercise an influence on the inside and outside diameter of the tube to be manufactured—such that, if there is a deviation of the ratio $D_{Ra}$ to $D_{Ri}$ to a specified nominal value—a control signal is produced and, with it, a valve upstream of the suction pump is being controlled and closed so long until the nominal value is reached again. The valve will again be opened after the nominal value is reached. This control action is permanently repeated to keep the tube to be manufactured within specified nominal value limits with regard to its inside and outside diameter. Here, the diameter (outside and inside diameter) of the tube is advantageously measured directly, seen in the tube drawing direction, after the transitional area, thus still in the heating chamber; and these geometric data are used for producing the control signal for regulating the pressure difference.

It has been shown that the specified method is especially suitable for the manufacture of tubes in which the ratio ($D_{Ra}/D_{Ri}$) of tube outside diameter to tube inside diameter is greater than 1.5; moreover, this ratio ($D_{Ra}/D_{Ri}$) should preferably be within the range of between 1.8 and 5.0. Moreover, the method can be optimized for tubes in which the ratio $D_{Ra}$ to $D_{Ri}$ is greater than 1.5 when a semifinished product is used whose ratio of semifinished product outside diameter $D_{Ha}$ to semifinished product inside diameter $D_{Hi}$ is within the range of between 1.5 and 4.5.

The method according to the invention is particularly suitable for the manufacture of capillary tubes having a small inside diameter and high breaking strength since tubes with relatively thick walls can be produced in one process step.

In particular, the method is also used for the manufacture of a tube for the production of an optical waveguide. Semifinished products of high-purity quartz glass, especially of synthetic glass, are used for this. The tubes thus manufactured are used as casing tubes here, for example in the manufacture of optical waveguides according to the known rod-in-tube technique or as substrates in the known MCVD or PCVD methods.

Hereinafter, preferable method parameters are described—with reference to the drawing—on the basis of embodiments for the realization of the method according to the invention, as well as the design of a corresponding device for the realization of the method.

As shown in the FIGURE, the arrangement for realizing the method according to the invention comprises a vertically arranged furnace 1 with a top furnace inlet 2 and a bottom furnace outlet 3. The internal heating chamber 4 of furnace 1 is heatable to temperatures of up to above 2300° C.

A quartz glass hollow cylinder 5, closed on its top side by a carrier 6, is introduced as a semifinished product into the furnace inside chamber 4 via furnace inlet 2 from the top side, by means of a suitable guiding device. The quartz glass hollow cylinder 5 is, at its upper end closed by carrier 6—connected with a process vessel 8 via a supply line 7, the vessel being connected on the one hand with an inert gas supply 10 via a shutoff valve 9, and on the other hand with a regulator valve 11 and a vacuum pump 12.

A quartz glass hollow cylinder 5 as the semifinished product is passed into the inside chamber 4 of furnace 1; it is softened therein within the area of a deformation zone 13 which is hinted at by a dotted line circle approximately in the center of the furnace inside chamber 4 so that a drawing bulb 15 is formed by drawing in the direction of the arrow 14 and by reducing the wall cross section of the quartz glass hollow cylinder 5. A drawing device 16 with guide rolls 17 is provided on the outlet side of furnace 1.

In the area of the drawn off tube 18, as shown in the figure, the tube's inside space 19 or, respectively, the inside space of the quartz glass hollow cylinder 5 is closed by means of a plug 20, such as a silicone plug.

During the drawing action, the pressure conditions in inside chamber 4 of furnace 1, as well as the tube's inside space 19 or, respectively, the inside space of the quartz glass hollow cylinder 5 can be defined, adjusted and changed. For this will be provided a pressure gauge 21 for monitoring the pressure in the inside chamber 19, as well as another pressure gauge 22 for measuring the pressure in the inside chamber 4 of furnace 1. Furthermore provided, as shown in the drawing: a pressure regulator 23 which controls the regulator valve 11; a temperature regulator 24 for regulating the furnace temperature; a pyrometer 25 for measuring and monitoring the set furnace temperature; another pyrometer for measuring the temperature in the area of the drawing bulb 15; a diameter gauge 27 for measuring the diameter of the drawn off tube 18 immediately following the drawing bulb 15, i.e. within the furnace chamber 4; another diameter gauge 28 for measuring the diameter of the drawn off tube 18 outside of furnace 1; a wall thickness gauge 29 for measuring the wall thickness of the drawn off tube 18 outside of furnace 1; a speed gauge 30 for measuring the drawing speed of tube 18 in the direction of arrow 14; as well as a speed regulator 31 which controls the drawing device 16 and thus sets the rotary speed of guide rolls 17. All regulators, gauges and other devices as specified above are connected with a central process regulation and control system 32. As indicated by the input arrow 33, the nominal values are to be entered via the central process regulation and control system, for example the tube dimensions not only of the quartz glass hollow cylinder 5 but also of the desired tube 18 to be manufactured; the required mass throughput, etc. The measuring points of the first diameter measurement, directly below the drawing bulb 15, to be performed by the diameter gauge 27 are once more separately indicated by arrow 34, while the second measuring point for the drawn off tube 18, outside of furnace 1, has been designated by an arrow 35 for the diameter gauge 28.

As evident by the numerous measuring and control devices as well as the other monitoring devices, the manufacture of a tube 18 with desired dimensions—starting from a quartz glass hollow cylinder 5—can be permanently monitored and newly set or, respectively, adjusted to the conditions.

With the above specified setup, a tube 18 was manufactured as a typical example; the tube having a tube outside diameter of 50 mm, a tube inside diameter of 12 mm, i.e. a diameter ratio $D_{Ra}/D_{Ri}$ of 4.17, for which a quartz glass hollow cylinder 5 was used as the semifinished product whose ratio of outside diameter $D_{Ha}$ to inside diameter $D_{Hi}$ had a value of 3.17. Throughput was 34 kg/h in this case. Drawing was performed at a heating chamber temperature of 2300° C. (the temperature in the interior chamber 4 of furnace 1). During operation of furnace 1, $P_2$ in the heating chamber 4 was approx. 1120 mbar. To produce the above specified tube ratio of 4.17, a pressure $P_1$ of 1070 mbar had to be adjusted in the tube inside chamber 19. To this end, inside chamber 19 of tube 18 was closed by the seal 20, like a silicone plug, at the end of tube 18. Inside pressure was produced by means of the vacuum pump 12 via a connecting piece—carrier 6 in the figure—at the top end of the quartz glass hollow cylinder 5. To dampen possible pressure variations, the process vessel 8 is inserted as a buffer between the vacuum pump 12 and the quartz glass hollow cylinder 5.

After a desired length of tube 18 has been drawn off, it can be separated. The pressure in the inside chamber 19 temporarily breaks down. After the tube end is then again closed with seal 20, the pressure loss can be balanced within a period of <2 seconds on the basis of the pressure control system.

It has been shown that, within such a short time span, no negative effects whatsoever on the tube's dimensions can be noted so that tubes 18 can be drawn off with a consistent wall thickness as well as inside and outside diameters.

Two examples of tubes 18 were as follows, manufactured from quartz glass hollow cylinders 5 with typical dimensions and operating parameters:

EXAMPLE 1

Outside diameter of the quartz glass hollow cylinder $D_{Ha}$=162 mm

Inside diameter of the quartz glass hollow cylinder $D_{Hi}$= 48 mm

Ratio $D_{Ha}/D_{Hi}$=3.375

Dimensions of the Tube
  Tube outside diameter ($D_{Ra}$)=60 mm
  Tube inside diameter ($D_{Ri}$)=15 mm
  Ratio $D_{Ra}/D_{Ri}$=4
  Quartz glass throughput: 35 kg/h
  Temperature in the furnace inside chamber 2200° C.
  Pressure difference between pressure $P_2$ in the heating chamber and pressure $P_1$ on the inside of the tube: 30 mbar, with $P_2$ being 1090 mbar.

EXAMPLE 2

Outside diameter of the quartz glass hollow cylinder $D_{Ha}$=162 mm
Inside diameter of the quartz glass hollow cylinder $D_{Hi}$= 52 mm
Ratio $D_{Ha}/D_{Hi}$=3.116
Dimensions of the Tube
  Tube outside diameter ($D_{Ra}$)=67 mm
  Tube inside diameter ($D_{Ri}$)=16 mm
  Ratio $D_{Ra}/D_{Ri}$=4.188
  Quartz glass throughput: 47 kg/h
  Temperature in the furnace inside chamber 2300° C.
  Pressure difference between pressure $P_2$ in the heating chamber and pressure $P_1$ on the inside of the tube: 15 mbar, with $P_2$ being 1090 mbar.

What is claimed is:

1. A method for the manufacture of a tube of vitreous material, said method comprising:
  supplying a cylindrical semifinished product of vitreous material in an essentially vertical direction to a heating zone in a heating chamber, said semifinished product and the tube having an interior space therein;
  heating said semifinished product so that the semifinished product is drawn off downwards to form the tube, said semifinished product having a transitional area adjacent to the tube;
  measuring a geometrical parameter of the tube during the heating of said semifinished product; and
  generating a control signal derived from the measured geometrical parameter, said control signal regulating in at least the transitional area a pressure difference between a pressure $P_1$ in the interior space, and a pressure $P_2$ in the heating chamber;
  the tube and the semifinished product each having a respective inside diameter and outside diameter, the ratio of the outside diameter of the tube to the inside diameter thereof being greater than the ratio of the outside diameter of the semifinished product to the inside diameter thereof;
  the pressure $P_1$ being maintained to be lower than the pressure $P_2$ in the heating chamber.

2. The method of claim 1, wherein the vitreous material is quartz glass.

3. The method of claim 1, wherein the geometrical parameter is a diameter of the tube.

4. The method of claim 1, wherein the geometrical parameter is a wall thickness of the tube.

5. The method of claim 1, wherein a second geometrical parameter is also measured and used to generate the control signal, said geometrical parameters including a wall thickness and a diameter of the tube.

6. The method of claim 1, wherein pressure $P_1$ is maintained by a suction pump operatively communicating with the interior space.

7. The method of claim 6, wherein the end of the tube facing away from the semifinished product is kept closed during formation of the tube and pressure $P_1$ is kept at a precalculated value by means of the suction pump and by a regulated feed of a gas flow supplied to the interior space.

8. The method of claim 7, wherein the gas flow is passed through a vessel between the suction pump and the interior space.

9. The method of claim 7, wherein the gas flow is of an inert gas supplied to the interior space.

10. The method of claim 1, wherein the pressure $P_1$ is maintained at a level which is 5 mbar to 200 mbar smaller than the level of pressure $P_2$.

11. The method of claim 1, wherein the pressure $P_1$ is maintained at a level which is 10 mbar to 60 mbar smaller than the level of pressure $P_2$.

12. The method of claim 1, wherein the pressure $P_2$ is maintained at a level of at least 1000 mbar.

13. The method of claim 1, and further comprising, responsive to detecting a deviation of the ratio of the outside diameter of the tube to the inside diameter thereof from a predetermined nominal value, closing a valve upstream of the suction pump until the nominal value is reached again, and then opening the valve.

14. The method of claim 1, wherein the ratio of said outside diameter of the tube to the inside diameter thereof is >1.5.

15. The method of claim 14, wherein the ratio of the outside diameter of the semifinished product to the inside diameter thereof is in the range of between 1.5 to 4.5.

16. The method of claim 1, wherein the ratio of said outside diameter of the tube to the inside diameter thereof is in the range of between 1.8 to 5.0.

17. The method of claim 1, wherein the ratio of the outside diameter of the semifinished product to the inside diameter thereof is in the range of between 1.5 to 4.5.

18. The method of claim 1, wherein the tube is a capillary tube.

19. The method of claim 1, wherein the semifinished product is of a high-purity quartz glass and the tube is configured for use in the production of an optical waveguide.

20. The method of claim 19, wherein the semifinished product is of synthetic quartz glass.

21. The method of claim 1, wherein the geometrical parameter measured is a diameter of the tube or a wall thickness of the tube.

* * * * *